(12) United States Patent
Needham et al.

(10) Patent No.: US 8,341,148 B1
(45) Date of Patent: Dec. 25, 2012

(54) ACADEMIC ACTIVITY STREAM

(75) Inventors: Catherine Needham, Oakland, CA (US); D. Drake Callahan, Sammamish, WA (US); Amy Y. Huang, San Francisco, CA (US); Douglas P. Britsch, Seattle, WA (US)

(73) Assignee: Apollo Group, Inc.

( * ) Notice: Subject to any disclaimer, the term of this patent is extended or adjusted under 35 U.S.C. 154(b) by 0 days.

(21) Appl. No.: 13/403,906

(22) Filed: Feb. 23, 2012

Related U.S. Application Data (63) Continuation of application No. 13/186,212, filed on Jul. 19, 2011.

(51) Int. Cl.
  *G06F 7/00* (2006.01)
  *G06F 17/30* (2006.01)
(52) U.S. Cl. .................................. 707/725; 705/319
(58) Field of Classification Search ............... 707/725, 707/751; 705/319
  See application file for complete search history.

(56) References Cited

U.S. PATENT DOCUMENTS

| | | | |
|---|---|---|---|
| 7,669,123 B2 * | 2/2010 | Zuckerberg et al. | 715/273 |
| 2006/0233322 A1 * | 10/2006 | Allman et al. | 379/88.01 |
| 2008/0052343 A1 * | 2/2008 | Wood | 709/202 |
| 2008/0162510 A1 * | 7/2008 | Baio et al. | 707/100 |
| 2009/0070346 A1 * | 3/2009 | Savona et al. | 707/100 |
| 2010/0057682 A1 * | 3/2010 | Ramsay et al. | 707/3 |
| 2010/0162135 A1 * | 6/2010 | Wanas et al. | 715/753 |
| 2011/0004831 A1 * | 1/2011 | Steinberg et al. | 715/753 |
| 2011/0022602 A1 * | 1/2011 | Luo et al. | 707/748 |
| 2011/0212430 A1 * | 9/2011 | Smithmier et al. | 434/322 |
| 2012/0244505 A1 * | 9/2012 | Lang et al. | 434/322 |
| 2012/0244506 A1 * | 9/2012 | Lang et al. | 434/322 |

* cited by examiner

*Primary Examiner* — Jeffrey A Burke
(74) *Attorney, Agent, or Firm* — Shane T. Lunceford (57) ABSTRACT

A method and computer-readable medium for generating an activity stream is provided. The activity stream includes a ranked set of objects that are presented to one or more users. The ranking of objects is updated to reflect events associated with objects.

22 Claims, 3 Drawing Sheets

ACADEMIC ACTIVITY STREAM

CROSS-REFERENCE TO RELATED APPLICATIONS

Benefit Claim

This application is a Continuation of application Ser. No. 13/186,212, filed Jul. 19, 2011, the entire content of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to methods of organizing objects in an online learning environment.

BACKGROUND

In general, people are interested in receiving notifications, especially when the notifications are related to items, content, activities, or events in which the people have shown previous interest or with which they are otherwise associated. For example, a person may be interested in news items associated with a particular keyword or information associated with the release of a product. In order to stay up to date on this information, tools have been developed to allow people to subscribe to email alerts, newsfeeds, and other lists that generally involve a group of items that are ordered chronologically. For example, a news feed may list the most recent news item at the top of a list, while the least recent news item may be at the bottom.

User activity feeds also tend to be chronologically based. A user of a social networking site, for example, may be "connected" to hundreds of friends. Status updates made by friends of the user are often displayed in a feed on the user's home page in chronological order. One problem with seeing feeds in this way is that a feed could have hundreds of items, and the most interesting item is very far down the list. Even if steps are taken to prune seemingly less interesting items from the list, the most interesting item may still be low on the "interesting" list if it a large number of items have been added to the interesting list after the first item was added to the list. Because the addition of new interesting items at the top of the list pushes pre-existing interesting items to lower positions on the list, interesting items eventually get pushed off the list (or at least off the first page of the list that is displayed to the user). When this happens, it may be difficult for a user to "catch up" with the popular items from previous days.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for implementing an activity stream. An activity stream includes a ranked list of objects that are associated with each other. Within an activity stream, an object (such as an assignment or course syllabus) may have events associated with it. For example, a student can "comment" on an assignment. The assignment may be listed as an object within the activity stream, and the comment may be posted under the assignment, in the activity stream, as an event that is associated with the assignment. A variety of objects can appear in an activity stream, and each object may have comments and other events listed underneath.

The location of an object in the activity stream changes based on events that happen in association with objects in the stream. However, rather than simply being pushed further down the list every time a new object is added to the activity stream, techniques are provided for moving objects within the activity stream in other ways.

For example, in one embodiment, a book chapter that is currently at a low position in the activity stream rises to the top of the activity stream every time a student comments on the chapter. This dynamic re-ordering of objects in the activity stream is based on the frequency or recency of events associated with the objects, and/or the popularity of the objects. In one embodiment, users are given the ability to dynamically change the way that activity stream objects are ranked, and how the objects move within the stream in response to events.

In an embodiment, the activity stream is shared, and every user sees the same ranking of objects in the stream. In another embodiment, the activity stream is based on user preferences. Other user-information is used to further customize the activity stream to make the activity stream more relevant to the user. Multiple activity streams are available to students.

In an embodiment, the activity stream is divided into sections that are based on a segment of time. For example, the activity stream may be divided by day. When a day ends, the activity stream section associated with the day that has ended is "frozen," so that no more changes will be made to that section of the activity stream. This provides a "snapshot" of each day's activity stream for users.

Learning Objects

In some online learning environments, points and other forms of credit are earned by participating in online discussions or by otherwise contributing to the educational experience of the classroom community. In these scenarios, student contributions may be associated with a particular object. In the context of online learning environments, these objects are sometimes referred to as "learning objects." Learning objects may include books, chapters of books, videos and other multimedia content, audio files, user-generated content, assignments, a syllabus, or any other content that is accessible via a computing interface such as a personal computer or mobile computing device.

Learning objects may also include instructor notifications or topics of discussion. For example, an instructor may use an instructor interface to post a topic as an activity feed object in an attempt to generate discussion. There are no limits on the textual content of the topic in an embodiment, and the topic may include hyperlinks or embedded media. A topic may be, for example, a video clip of a debate with associated text that states: "Which of the debate participants was more persuasive, and why?" Students, as well as the instructor, are then able to comment on the topic. As students respond to the discussion in a thoughtful manner, the instructor may reward the students with points, grades, or other forms of recognition based on the quality of the student posts.

Events

As used herein, an "event" refers to any occurrence that is associated with an object. For example, a comment is a type of event. Comments are associated with the objects to which the comments are directed. For example, when a user comments on a chapter of a book, the comment is associated with the object that corresponds to that chapter. In an embodiment, the associations between objects and events are implicitly made by the user, who selects the one or more objects to comment on. Comments are not limited to textual comments. For example, comments may also be audio comments, video comments, hyperlinks, computer code, other multimedia, and any combination thereof.

Figure 1:
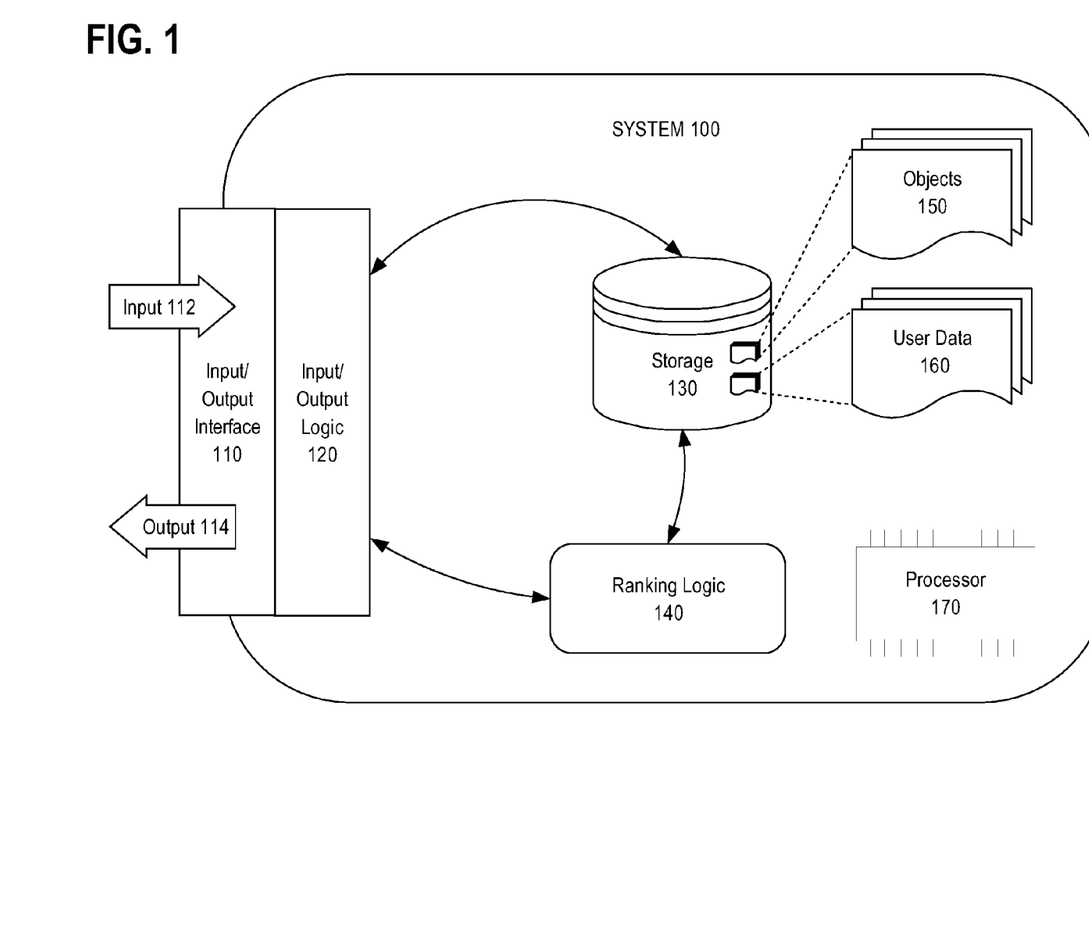
FIG. 1 represents a block diagram of an example system for generating an activity stream.

Events may also include scheduled or unscheduled alerts and notifications associated with an object. An alert may be associated with an object that represents an assignment for the class. In this case, a reminder can be generated to alert students of an upcoming due date. Other notifications may include statistical information that helps students pace their studies. For example, a system event may be triggered when a threshold associated with an object is reached. In an embodiment, when 75% of the students in the class have read a book chapter, an event is generated and placed in the activity stream in order to notify all students of the progress. This allows students to recognize the pace of the rest of the class, and modify study habits, if needed. A learning management system may be used to feed triggering information to system 100, such as whether or not students in the course have completed a particular project or whether they have read a particular chapter in a book. Since the project and book chapter are learning objects associated with a class, they are capable of being associated with comments and other events.

Events may also be associated with other events. For example, a first student may comment on a learning object. A second student may then comment on the first student's comment. Likewise, a student may post multimedia content in response to the comment of another student.

The Activity Stream System

FIG. 1 is a block diagram that illustrates a system 100, according to an embodiment. Referring to FIG. 1, input 112 is received by the system 100 at an input/output (IO) interface 110. IO interface 110 may be a network interface such as an Ethernet-based interface. Input 112 includes event data received from users of system 100, such as comments or other user data 150 about objects 160 stored in storage 130.

IO logic 120 is coupled to IO interface 110. IO logic is configured to parse and distribute incoming data and prepare output 114 for sending via IO interface 110. IO logic 120 may implement one or more communications protocols. IO logic 120 is coupled to a storage 130 which may be, for example, a database stored on storage media. In the illustrated Objects 150 include learning objects. A "learning object" is any object that is used to facilitate learning. For example, learning objects may include books, videos, or subsets of each, such as chapters of books or video clips. Other types of objects, discussed below, are stored in storage 170. User data 160 includes information about users. User data 160 includes user preferences, comments, and other user-generated content.

Event data from a user computing device is received as input 112 to system 100 via IO interface 110. IO interface 110 provides input 112 to storage 130, which stores the event data in a table associated with user data 160. Ranking logic 140 determines a ranking of objects 150 to be sent to the user computer based at least in part on the event data. For example, event data may be associated with a particular object, causing the ranking of that object to change. The ranking associated with the object may be stored in a table associated with objects 150 in storage 130. Ranking logic 140 generates an activity stream associated with objects 150 based on the ranking and provides the ranking to IO logic 120. IO logic prepares the activity stream for transmission, and provides the result as output 114 to IO interface 110, which sends output 114 to the user's computing device.

Activity Stream

Figure 2:
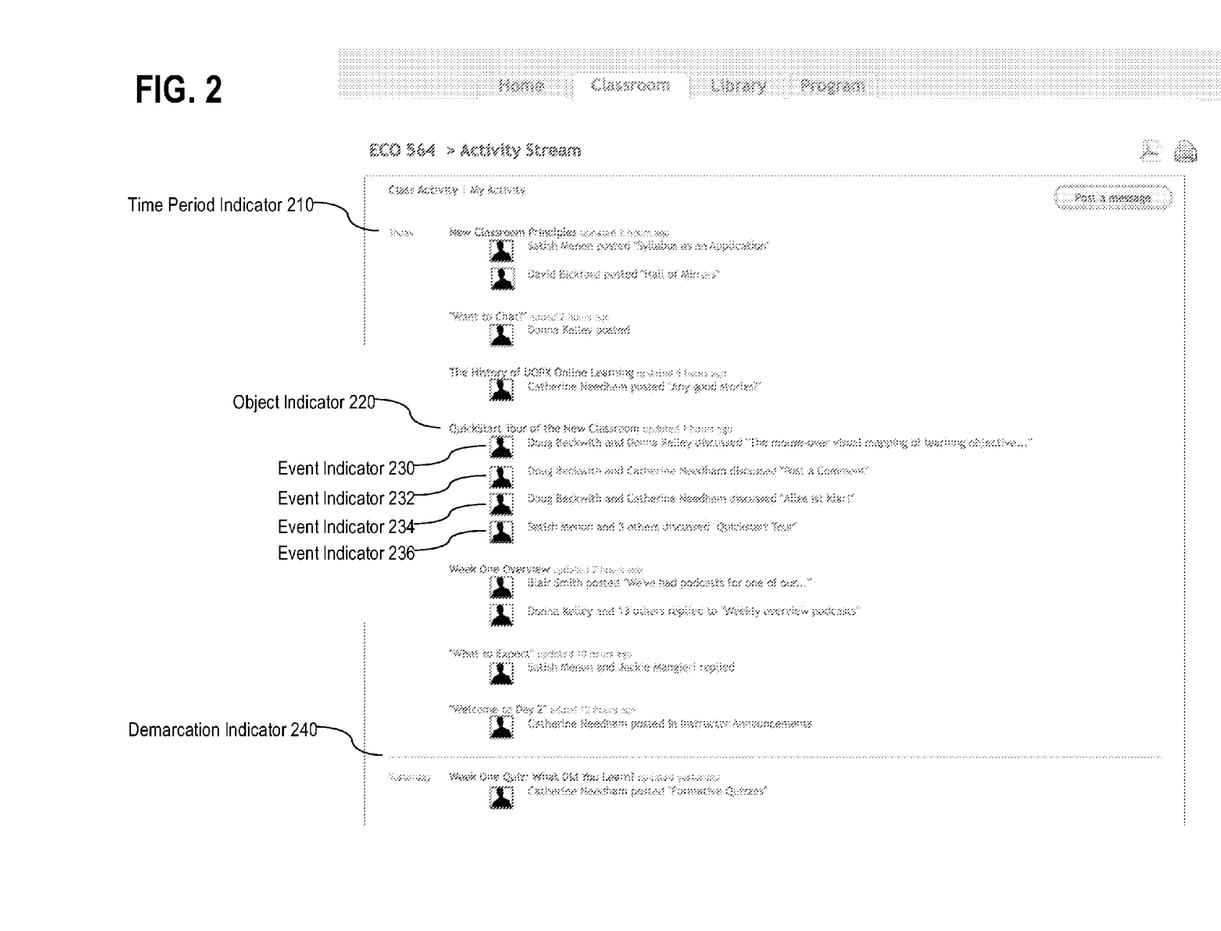
FIG. 2 illustrates an example user interface with an activity stream in an embodiment.

FIG. 2 illustrates an example user interface displaying an activity stream in an embodiment. Referring to the activity stream of FIG. 2, a time period indicator 210 indicates a period of time associated with a portion of the activity stream. Time periods may be based on days, weeks, or any other time measurement. Demarcation indicator 240 indicates the end of one period of time, and the beginning of another. By segmenting an activity stream based on some criteria, such as time, users of the activity stream are able to see a "snap-shot" of a portion of the activity stream to see what the activity stream looked like at the end of a particular time period. In one embodiment, because the segments of past time periods are frozen as snap-shots, the contents of those segments remain unchanged even when an event occurs that would otherwise cause an object within the frozen segment to be moved to another portion of the activity stream.

Segmentation criteria other than time may also be used. The activity stream may be segmented by triggers associated with the class. For example, a segment may be defined each time a new assignment is provided to the class. As another example, the activity stream may be segmented by topic, where all objects and events related to a particular topic are added to the segment for that topic. In such an embodiment, an object or event that relates to multiple topics may appear multiple times in the activity stream, once under each of the related topics.

In an embodiment, students are associated with a class, such as Ecology 564. The instructor for Ecology 564 may provide a list of available or required resources to facilitate learning, such as multimedia presentations, e-books, or assignments. All of these resources may be identified in system 100 as learning objects that are associated with the Ecology 564 class, and therefore the Ecology 564 shared activity stream. This particular activity stream is called a shared activity stream because each student in the Ecology 564 class has access to the Ecology 564 activity stream, and this activity stream looks the same to each student in the class.

A student in the class may interact with one of the Ecology 564 learning objects. For example, the learning object may be the "QuickStart Tour of the New Classroom." As part of the interaction, the student is provided with the opportunity to generate an event associated with the learning object. Events may be associated with the learning object in general, or they may be associated with a portion of the learning object. For example, the student may want to discuss a particular section of the "QuickStart Tour of the New Classroom" object called "Post a Comment." When the student posts a comment, an event indicator such as event indicators 230-236 is placed in the activity stream in association with an object indicator such as object indicator 220.

If an object indicator associated with an object has not already been placed in the activity stream when an event associated with an object is detected, one will be generated and placed in the activity stream. Likewise, if an event indicator has not been placed in the activity stream in association with the event, one will be created.

Event indicators can be "overloaded." This means that event indicators may be used to indicate that more than one event has occurred for a particular learning object. In an embodiment, event indicators are displayed with the comment, text, or other content that is associated with the event. In another embodiment, event indicators are displayed with links to the content that is associated with the event. In an embodiment, only overloaded event indicators are displayed with links to the content for the events that are associated with the overloaded indicator.

In an embodiment, learning objects are collections that are divided into sections, chapters, or distinct parts. Sections, chapters, and parts are also objects. For example, a collection may be a book, which is divided into chapters. In an embodiment, when a student comments on a section of a collection object, an object indicator for the collection object is displayed in the activity stream, and a link associated with the section is placed next to an event indicator that is placed in the activity stream in association with the object indicator. The event indicator may include text that identifies the student and/or the section. When the link is selected, event data, such as comments, text, and multimedia content associated with the section are shown.

Links or other controls associated with event indicators and object indicators, when selected by a user, may direct the user's browser to a new web page that includes additional event information, such as comments about an object. Optionally, controls can cause the event data to be presented in the activity stream without causing the user's browser to change web pages. For example, selecting a link associated with an event indicator or an object indicator may invoke an expansion operation that causes event data to appear below the associated event indicator. Selecting the control again may invoke a contraction operation, causing a reversion to the pre-expansion interface.

Different types of activity streams may be generated. A "personal activity stream" may be generated for a specific user based on that user's preferences, associations, and events that are private to that user. For example, a personal activity stream may include grades, alerts for all classes for which the student is enrolled, and learning object discussions for objects the student has already commented on. Email notifications and other student messages that are directed to the student may also be provided in a personal activity stream. In an embodiment, personal activity streams are not shared with others.

Personal activity streams may be aggregate activity streams, which include content from multiple activity streams. A personal activity stream may include content from several activity streams that the student subscribes to or is otherwise associated with. For example, a student may be enrolled in four classes, and each class may be associated with a separate activity stream. The student may view a single activity stream that includes all or some information from the set of streams he is associated with. Thus, information from shared streams and personal streams may be aggregated to form an aggregate personal activity stream.

Shared activity streams may be used in situations where it is desirable for all who are associated with the activity stream to see the same content. For example, all students that are enrolled in Ecology 564 will see the same shared activity stream associated with that class in an embodiment.

Ranking Objects in an Activity Stream

Objects are "placed" within a ranked list that is used to generate an activity stream. As used herein, placing an object at a position in an activity stream or ranked list means to associate the object with a position on a list Likewise, to place an event means to associate an event. This information is used to generate object indicators and event indicators, and cause them to be placed in a particular location on a user interface.

One way to place objects on an activity stream is to place each object at the top of the activity stream the first time that object has an event associated with it. Using this method, each object is added to the list once, and has an opportunity to be at the top. However, as other Objects take their place at the top, the earlier events are "bumped" to a lower position. The position will not change for an object, even if additional events are detected in association with that object, unless another object is placed at the top of the activity stream.

In online learning environments, it is sometimes desirable to call attention to events that are getting a lot of attention. For example, if a topic posted by an instructor is generating a lot of discussion among the students in the class, a student may wish to join the discussion in order to seize an opportunity to increase their participation grade or otherwise earn points for the class. Several ranking methods may be implemented in order to ensure that these "hot topics" are not lost in the activity stream, and to draw attention to them.

In an embodiment, ranking logic 140 ranks objects according to popularity. Students rank objects according to their interest in the objects, and the most highly ranked objects are displayed at the top of the activity stream. A popularity metric associated with each object is incremented or decremented depending on student feedback. Any method of ranking, such as a star-rating system, can be used (i.e., students assign a star value from 1 to 5 to each object). Any other method of determining popularity may be used. The most popular object is then placed at the top of the activity stream. Other objects are also ranked according to popularity. This is not always the same as putting the most overall popular object at the top. In an embodiment, popularity is valid over a specific time range, and the popularity metric is reset at the end of each day. The results of each day are "frozen" at the end of the day, and each object has an equal opportunity to become the most popular object each day.

In an embodiment, ranking logic 140 ranks objects based on recency. In an academic environment, students may benefit from knowing where the action is now. Sometimes the most popular item for the day is not the most popular item for the moment. Students seeking to enter a discussion to earn participation credit for a class may benefit from knowing which object an event associated with it. Each time an event is generated with respect to an object, that object is placed at the top of the activity stream, bumping the next-most-recent event down the ranked list. Ranking changes may be, but need not be, displayed on a user interface immediately. Instead, ranking changes may be applied to a web page at a predetermined time interval, upon the user refreshing the web page, or at any other time. If discussions for a class become stagnant, the ranking method may be changed to the popularity-based ranking discussed above.

It may be the case that the most recent item is not the object associated with the highest frequency of events. Sometimes, the object associated with the highest frequency of events is the object that is most consistently capable of generating discussion. Therefore, the number of events associated with an object over a particular period of time may be averaged in order to select the object that most consistently attracts events. For example, the object with the most events created in association with it within the last hour will be placed at the top of the activity stream in an embodiment.

Ranking logic 140 uses a round-robin ranking approach is used in an embodiment to swap out topics and other objects to try to increase their popularity. For example, each object in a particular stream, in a particular segment of that activity stream, is placed in the first position in the ranked list at least once. Each object in the activity stream, after completing its turn at the first position, is subsequently placed in each position in the ranked list.

Events remain associated with the objects, even as the rankings change. Therefore, event indicators move with their associated objects.

Users may choose which type of ranking method to use. Users may also specify a weight to apply to each method, and use multiple methods of ranking. For example, users may indicate that recency should dictate which item is at the top of the list, unless frequency for an object reaches a particular threshold.

Example Method for Generating an Activity Stream

In an embodiment, a ranked list of objects is generated by ranking logic 140. In response to detecting a first event associated with a first object in the ranked list of objects, ranking logic 140 places the first object in a first position in the ranked list. For example, the first event may be a comment associated with the first object, and the first object may be a book chapter. In response to detecting a second event associated with a second object in the ranked list of objects ranking logic 140 bumps the first object to the second position in the list, and places the second object in the first position. In response to another event associated with the first object, the first object is again placed at the first position.

In an embodiment, the ranked list is maintained as multiple segments. Each segment is associated with a time period. For example, each segment may be associated with a particular day. After the time period associated with a first segment has expired, ranking logic 140 "freezes" the ranking of objects associated with that segment, so that the ranking within that segment will no longer change.

In an embodiment, a user profile is maintained in user data 160 for users of the system, such as students, instructors, faculty, and staff. User profiles include object ranking profile information that indicates user preferences for use of ranking techniques. As a user changes ranking schemes, ranking logic 140 changes the way in which it generates activity streams for that user.

ALTERNATIVE EMBODIMENTS

In an embodiment, instructors or other users of the system 100 may be granted privileges to select objects to "pin" at the top of a particular activity stream. For example, an instructor may feel that a particular topic or other learning object is very important. By pinning the object to the top of the activity stream, the instructor can ensure that the students will see the object. An indicator, such as a coloring scheme or icon, may be used to alert students that the object is a "pinned" object.

In an embodiment, students may rank other students in order to customize their personal feed and follow students whose interaction they prefer. For example, a first student may not appreciate the tone of discussion generated by a second student. The first student may assign a low ranking to the second student, thereby informing ranking logic 140 that comments or other events generated by the second student are unwelcome or should be poorly ranked in the first student's activity stream.

In an embodiment, a threshold associated with events may be set to define what it takes to trigger the re-ordering of an activity stream. For example, one-word comments may not trigger the re-ordering of an activity stream.

In an embodiment, events associated with video or audio content may be generated through interaction with a media player. For example, when a student selects the play or pause button on a media player on a media player, events associated with the video content may be generated.

In an embodiment, data generated by ranking logic 140 is fed into a learning management system. The learning management system may use this data to recommend content associated with a particular class. For example, students may prefer a specific content item, even though multiple content items address the same learning objective.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
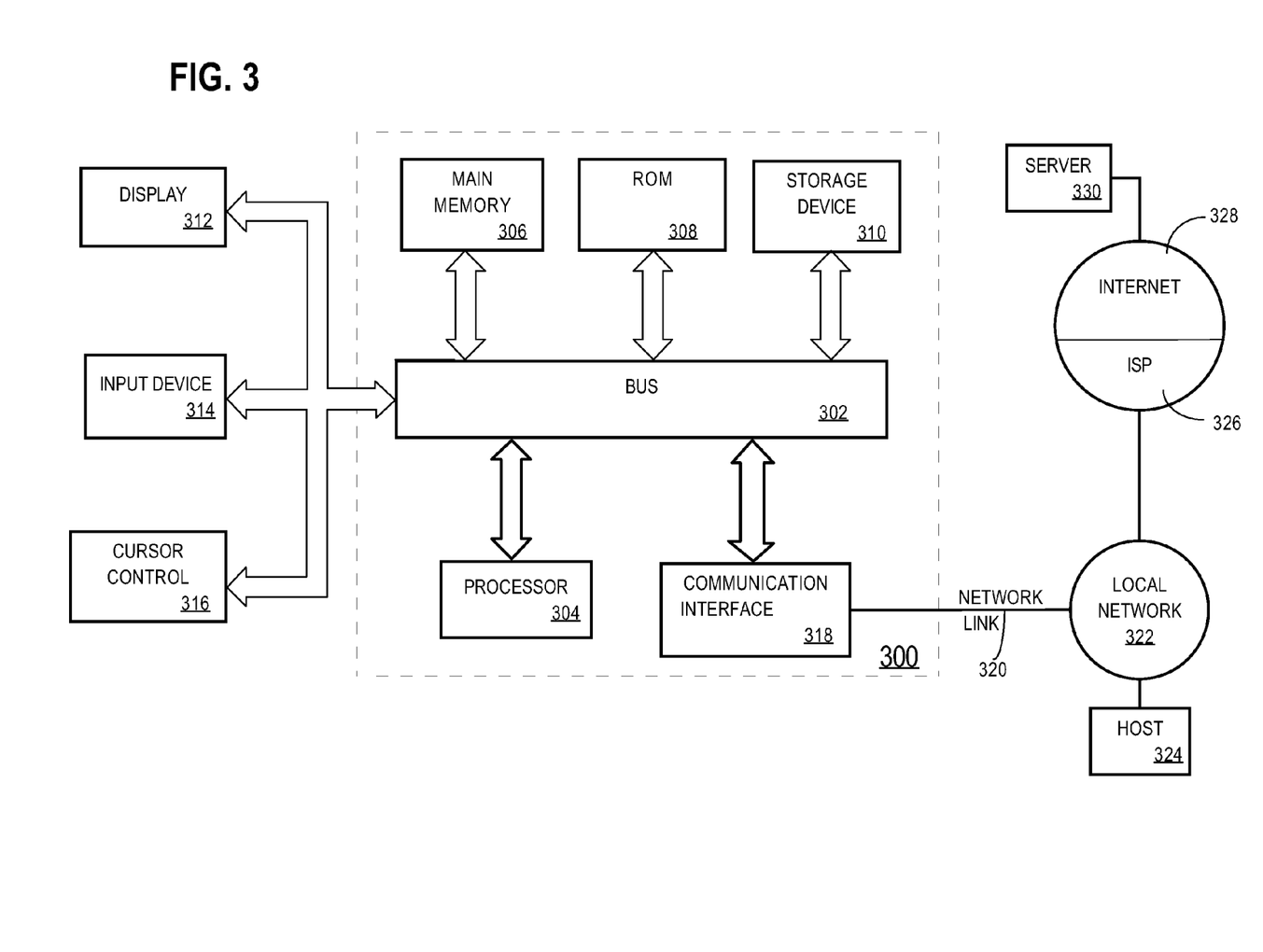
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   generating a ranked list of objects for an a shared activity stream, wherein each object in the ranked list is associated with a class;
   wherein each student of a plurality of students associated with the class may access the shared activity stream;
   in response to detecting a first event associated with a first object that is associated with the class, placing the first object in a first position in the ranked list;
   in response to detecting a second event associated with a second object in the ranked list of objects:
   moving the first object to a second position in the ranked list;
   placing the second object in the first position in the ranked list;
   in response to detecting a third event associated with the first object in the ranked list of objects, moving the first object to the first position in the ranked list, wherein the third event is user activity associated with the first object;

wherein the second event occurs after the first event and before the third event;

maintaining the ranked list as a plurality of segments, wherein each segment is associated with a time period;

maintaining a first segment that is associated with a first time period;

after detecting the expiration of the first time period:

causing the portion of the ranking of objects that is associated with first segment to remain static;

maintaining a second segment that is associated with a second time period;

dynamically updating the portion of the ranking of objects that is associated with the second segment in response to detecting a fourth event without updating the portion of the ranking of objects that is associated with the first segment;

wherein the method is performed by one or more computing devices.

2. The method of claim 1, wherein placing the second object in the first position in the ranked list is performed in response to determining that the second object is more popular than the first object.

3. The method of claim 1, wherein placing the second object in the first position in the ranked list is performed in response to determining that the second object has a higher frequency of associated events than the first object.

4. The method of claim 1, wherein moving the first object in the first position in the ranked list is performed in response to determining that the first object is the object associated with the most recent event.

5. The method of claim 1, further comprising:

maintaining, for each of a plurality of users, an object ranking profile, wherein each object ranking profile indicates object ranking preferences for an associated user of the plurality of users;

wherein a first object ranking profile associated with a first user indicates that the first user prefers a particular object ranking scheme;

wherein moving the first object in the first position in the ranked list is performed according to the particular object ranking scheme.

6. The method of claim 5, wherein the particular object ranking scheme is based at least in part on one or more of:

a) the recency of events that associated with objects;
b) the frequency of events associated with objects.

7. The method of claim 1, wherein:

at least one of the plurality of objects is a learning object; and one or more of the events represent comments associated with the learning object.

8. The method of claim 1, wherein the activity stream is a shared activity stream that is accessible by a plurality of users.

9. The method of claim 1, further comprising:

presenting the list of objects to a user;

wherein the first object is associated with a child object that is associated with the third event; and presenting the child object in association with the first object.

10. A method, comprising:

maintaining a ranked list of objects for an activity stream as a plurality of segments, wherein each segment is associated with a time period;

maintaining a first segment that is associated with a first time period;

in response to detecting a first event associated with a first object in the ranked list of objects during the first time period, changing the position of the first object in the first segment of the ranked list;

after detecting the expiration of the first time period:

in response to detecting a second event associated with the first object, causing the first object to appear in a second segment that is associated with a second time period without:

a) removing the first object from the first segment; or
b) changing the position of the first object within the first segment;

in response to detecting a third event associated with the first object during the second time period, changing the position of the first object in the second segment of the ranked list;

wherein the method is performed by one or more computing devices.

11. The method of claim 10, further comprising:

after detecting the expiration of the first time period:

causing the portion of the ranking of objects that is associated with first segment to remain static;

maintaining a second segment that is associated with a second time period.

12. A computer-readable non-transitory storage medium storing instructions, which, when executed by one or more processors, cause the one or more processors to perform:

generating a ranked list of objects for an a shared activity stream, wherein each object in the ranked list is associated with a class;

wherein each student of a plurality of students associated with the class may access the shared activity stream;

in response to detecting a first event associated with a first object that is associated with the class, placing the first object in a first position in the ranked list;

in response to detecting a second event associated with a second object in the ranked list of objects:

moving the first object to a second position in the ranked list;

placing the second object in the first position in the ranked list;

in response to detecting a third event associated with the first object in the ranked list of objects, moving the first object to the first position in the ranked list, wherein the third event is user activity associated with the first object;

wherein the second event occurs after the first event and before the third event;

maintaining the ranked list as a plurality of segments, wherein each segment is associated with a time period;

maintaining a first segment that is associated with a first time period;

after detecting the expiration of the first time period:

causing the portion of the ranking of objects that is associated with first segment to remain static;

maintaining a second segment that is associated with a second time period;

dynamically updating the portion of the ranking of objects that is associated with the second segment in response to detecting a fourth event without updating the portion of the ranking of objects that is associated with the first segment.

13. The computer-readable non-transitory storage medium of claim 12, wherein placing the second object in the first position in the ranked list is performed in response to determining that the second object is more popular than the first object.

14. The computer-readable non-transitory storage medium of claim 12, wherein placing the second object in the first position in the ranked list is performed in response to determining that the second object has a higher frequency of associated events than the first object.

15. The computer-readable non-transitory storage medium of claim 12, wherein moving the first object in the first position in the ranked list is performed in response to determining that the first object is the object associated with the most recent event.

16. The computer-readable non-transitory storage medium of claim 12, wherein the instructions further include instructions for:
   maintaining, for each of a plurality of users, an object ranking profile, wherein each object ranking profile indicates object ranking preferences for an associated user of the plurality of users;
   wherein a first object ranking profile associated with a first user indicates that the first user prefers a particular object ranking scheme;
   wherein moving the first object in the first position in the ranked list is performed according to the particular object ranking scheme.

17. The computer-readable non-transitory storage medium of claim 16, wherein the particular object ranking scheme is based at least in part on one or more of:
   a) the recency of events that associated with objects;
   b) the frequency of events associated with objects.

18. The computer-readable non-transitory storage medium of claim 12, wherein:
   at least one of the plurality of objects is a learning object; and
   one or more of the events represent comments associated with the learning object.

19. The computer-readable non-transitory storage medium of claim 12, wherein the activity stream is a shared activity stream that is accessible by a plurality of users.

20. The computer-readable non-transitory storage medium of claim 12, wherein the instructions further include instructions for:
   presenting the list of objects to a user;
   wherein the first object is associated with a child object that is associated with the third event; and
   presenting the child object in association with the first object.

21. A computer-readable non-transitory storage medium storing instructions, which, when executed by one or more processors, cause the one or more processors to perform:
   maintaining a ranked list of objects for an activity stream as a plurality of segments, wherein each segment is associated with a time period;
   maintaining a first segment that is associated with a first time period;
   in response to detecting a first event associated with a first object in the ranked list of objects during the first time period, changing the position of the first object in the first segment of the ranked list;
   after detecting the expiration of the first time period:
      in response to detecting a second event associated with the first object, causing the first object to appear in a second segment that is associated with a second time period without:
         a) removing the first object from the first segment; or
         b) changing the position of the first object within the first segment;
      in response to detecting a third event associated with the first object during the second time period, changing the position of the first object in the second segment of the ranked list.

22. The computer-readable non-transitory storage medium of claim 21, wherein the instructions further include instructions for:
   after detecting the expiration of the first time period:
      causing the portion of the ranking of objects that is associated with first segment to remain static;
      maintaining a second segment that is associated with a second time period.

* * * * *

UNITED STATES PATENT AND TRADEMARK OFFICE
CERTIFICATE OF CORRECTION

PATENT NO. : 8,341,148 B1
APPLICATION NO. : 13/403906
DATED : December 25, 2012
INVENTOR(S) : Catherine Needham et al.

Page 1 of 1

It is certified that error appears in the above-identified patent and that said Letters Patent is hereby corrected as shown below:

In the Claims:

COLUMN 10

Claim 1, line 52, delete "an a" and insert --a--

COLUMN 12

Claim 12, line 28, delete "an a" and insert --a--

Signed and Sealed this
Twenty-first Day of May, 2013

Teresa Stanek Rea
*Acting Director of the United States Patent and Trademark Office*